(12) United States Patent
Hercog et al.

(10) Patent No.: US 7,564,222 B2
(45) Date of Patent: Jul. 21, 2009

(54) METHOD FOR FAST-CHARGING A BATTERY AND DEVICE FOR CARRYING OUT SAID METHOD

(76) Inventors: Franc Hercog, Prusnikova 50, Maribor (SI) 2000; Karel Flisar, Volcji potok 38c, Radomije (SI) 1235

( * ) Notice: Subject to any disclaimer, the term of this patent is extended or adjusted under 35 U.S.C. 154(b) by 0 days.

(21) Appl. No.: 11/013,171

(22) Filed: Dec. 15, 2004

(65) Prior Publication Data

US 2005/0099157 A1    May 12, 2005

(30) Foreign Application Priority Data

Jun. 20, 2002    (SI) ................................ 200200157
Oct. 25, 2002    (SI) ....................... PCT/SI02/00024

(51) Int. Cl.
H02J 7/04    (2006.01)

(52) U.S. Cl. ........................ 320/139; 320/141; 320/142

(58) Field of Classification Search ................. 320/129, 320/133–134, 139, 141–142
See application file for complete search history.

(56) References Cited

U.S. PATENT DOCUMENTS

| 6,366,056 B1 * | 4/2002 | Podrazhansky et al. ..... 320/141 |
| 6,441,588 B1 * | 8/2002 | Yagi et al. ................... 320/139 |

* cited by examiner

*Primary Examiner*—Bao Q. Vu
*Assistant Examiner*—Samuel Berhanu
(74) *Attorney, Agent, or Firm*—Franc Hercog; Karel Flisar; Beem Patent Law Firm

(57) ABSTRACT

The present invention refers to a method for fast-charging a secondary battery and to a device for carrying out said method. Fast charging is achieved by converting a DC supply voltage into a pulsating voltage which is transmitted to the secondary battery to be charged. The pulsating voltage is lead to the battery in intervals of about 10 microseconds with pauses in between of about 100 microseconds and up to 10 milliseconds.

10 Claims, 2 Drawing Sheets

METHOD FOR FAST-CHARGING A BATTERY AND DEVICE FOR CARRYING OUT SAID METHOD

This application claims priority to the PCT application number PCT/SI2002/000024, filed Oct. 25, 2002.

The present invention refers to a method for a fast-charging a battery and a device for carrying out said method, particularly for fast-charging a battery which is independent of the type of secondary battery, the said secondary battery is charged with electrical power from an alternating and any other mains supply, respectively.

The above mentioned method and/or device for the charging the secondary battery is known and described, e.g. in EP 0 665 626 A1, EP 0 865 141 A2, GB 2 050 721 A and U.S. Pat. No. 3,863,129. The main problem of all known solutions lies in that the charging time of the secondary battery, in particular a lead battery, is relatively long. There also exist solutions to fast-charge the secondary battery, however, with these solutions the battery is totally destroyed and useless after two or three repeated chargings.

It is the object of the present invention to provide a method of fast-charging a secondary battery which obviates drawbacks of the known solutions and which enables fast-charging a secondary battery regardless of the type thereof.

Another object of the invention is to provide a method for measuring the charge of a secondary battery during charging itself.

Still another object of the present invention is to provide a device which enables fast and reliable multiple charging of a secondary battery, and measuring the charge of the said battery during charging itself.

The foregoing object and other objects of the invention have been achieved by a method of fast-charging of a secondary battery consisting of the following steps:
- converting an AC supply voltage into a DC voltage,
- converting the DC voltage gained in the previous step into a pulsating voltage,
- transmitting the pulsating voltage to the secondary battery to be charged,
- at least one measurement of a charge of the secondary battery.

In order to fast-charge the secondary battery, the amount of DC voltage required depends on the voltage and the number of cells of the secondary battery to be charged. Here, the DC voltage gained according to the first step corresponds approximately to twice the nominal voltage of the secondary battery to be charged. The said DC voltage remains unchanged during the charging period and it determines the peak value of the charging current which remains practically unaltered during the entire charging process and equals between 30 and 40 times the capacity of the secondary battery to be charged. The voltage on the secondary battery to be charged is measured during the charging process by means of a measuring amplifier and compared with a preset voltage value of the said battery.

A PWM modulation of the charging pulses is used in order to regulate the voltage. It has been proved that the modulation with a fixed length charging pulse and pauses of a variable length is particularly advantageous since there are fewer losses on the MOSFET transistor and thereby a more efficient fast-charging.

The height of the DC voltage gained according to the first step, ranges between 180% and 220%, and preferably between 190% and 210% of the nominal voltage of the secondary battery to be charged.

With the secondary battery empty the pulse length of the pulsating DC voltage gained according to the second step equals to approximately 10 microseconds, and the pause length equals to approximately 100 microseconds. In accordance with the charging of the secondary battery, the pause length gets longer and equals to approximately 10 milliseconds at the end of the charging process.

Furthermore, it has been proved as optimal with the completely empty secondary battery that the pulse frequency of the pulsating voltage gained according to the second method step ranges between 1 kHz and 15 kHz, preferably between 5 kHz and 10 kHz. The frequency lower than 5 kHz leads to the secondary battery overheating, and the frequency higher than 10 kHz increases the impedance of the battery to be charged to much. The ratio between the pulse duration and the time between the two subsequent pulses ranges from 1:5 to 1:10, preferably 1:8.

The method for fast-charging the secondary battery according to the invention may be applied only to the previously formed secondary battery. That means that for the first time, the secondary battery has to be charged by means of the method according to the invention where the charging pulses are approximately 5% to 10% longer than they normally would be. Each subsequent fast-charging is performed as described in the foregoing. The said formation of the secondary battery may be applied either on the brand new secondary battery, or on the secondary battery already exhausted, or it may constitute a part of the production thereof.

A device for carrying out a method according to the invention will be further described by way of example with reference to the accompanying drawings in which.

Figure 1:
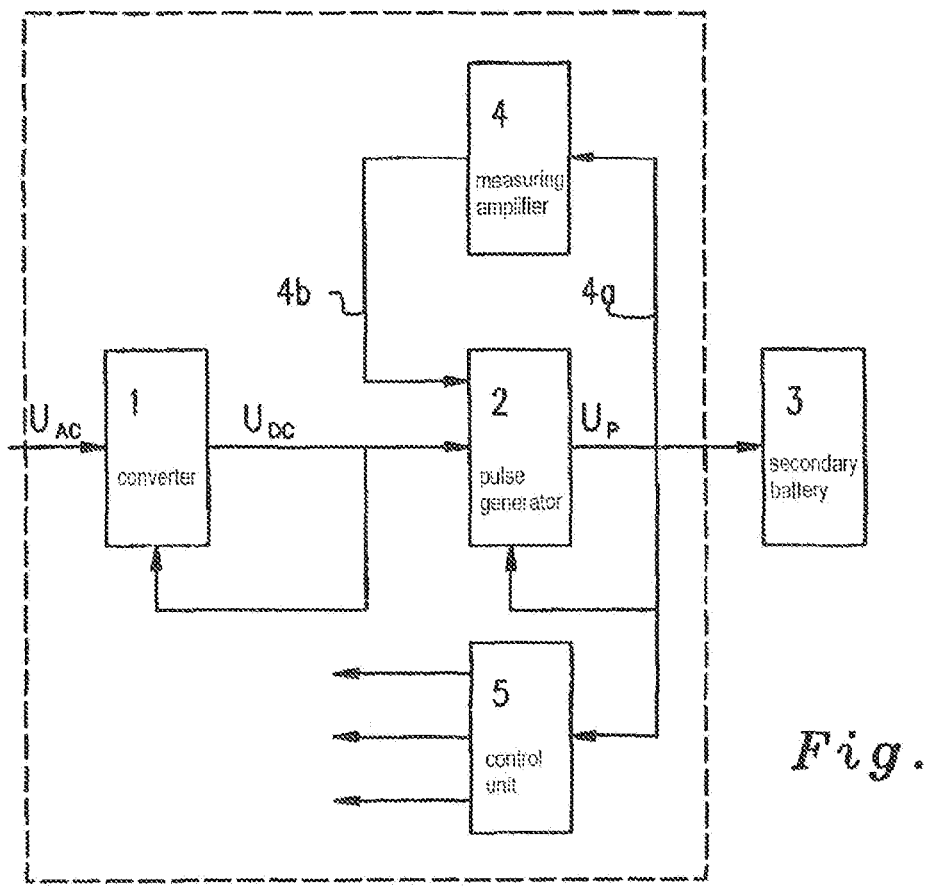
FIG. 1 is a block diagram illustrating a charging device.

A device for fast-charging of a battery, particularly of a secondary battery, where the said device per se is independent on the battery type, is shown in FIG. 1 within a dashed line rectangle. The device consists of a converter 1 of an AC voltage into a DC voltage, being connected at its input to the AC supply voltage $U_{AC}$, and providing on its output the DC voltage $U_{DC}$. The value of the said DC voltage $U_{DC}$ provided by the converter 1 equals approximately twice the nominal voltage of the secondary battery 3 to be charged. The converter 1 is connected in series with a pulse generator 2 providing a pulsating voltage $U_P$ of length $T_1$ and a pause $T_2$ between the two subsequent pulses. With the empty secondary battery 3 the pulse length $T_1$ of the DC voltage $U_P$ equals to approximately 10 microseconds while the pause length $T_2$ equals to approximately 100 microseconds. Here, the pause length $T_2$ depends on the level of the charge of the secondary battery 3 and increases continuously to approximately 10 milliseconds, in accordance with the charging of the secondary battery 3. The pulse generator 2 generates pulses of the pulsating voltage $U_P$ with the certain frequency which ranges between 1 kHz and 15 kHz. It has been proved that it is particularly advantageous if the said frequency ranges between 5 kHz and 10 kHz. In addition, it has been proved that the DC voltage $U_{DC}$ which depends on the voltage and the number of cells of the secondary battery is defined as follows:

$$U_{DC} = 2 \times U_C \times N_C \times 1.25$$

e.g. for Pb batteries with a capacity up to 2 Ah, and $$U_{DC}=2\times U_C\times N_C\times 0.9$$

e.g. for Pb batteries with a capacity above 2 Ah.

Here, $U_C$ represents the voltage of the cell and $N_C$ the number of cells in the battery.

The output of the said pulse generator 2 is connected in series with the secondary battery 3 to be charged, while by means of connections 4a, 4b it is connected in parallel with a measuring amplifier 4 measuring the voltage of the open terminals of the secondary battery 3, and it is connected in parallel with a control unit 5. It is of great importance that the connection between the pulse generator 2 and the battery 3 is provided with as low resistance as possible. Especially satisfactory results have been achieved if the said resistance lies below 0.1 Ohm. Generally speaking, it holds true that each connection between each component in the device according to the invention should have a resistance as low as possible, advantageously below 0.1 Ohm.

Figure 2:
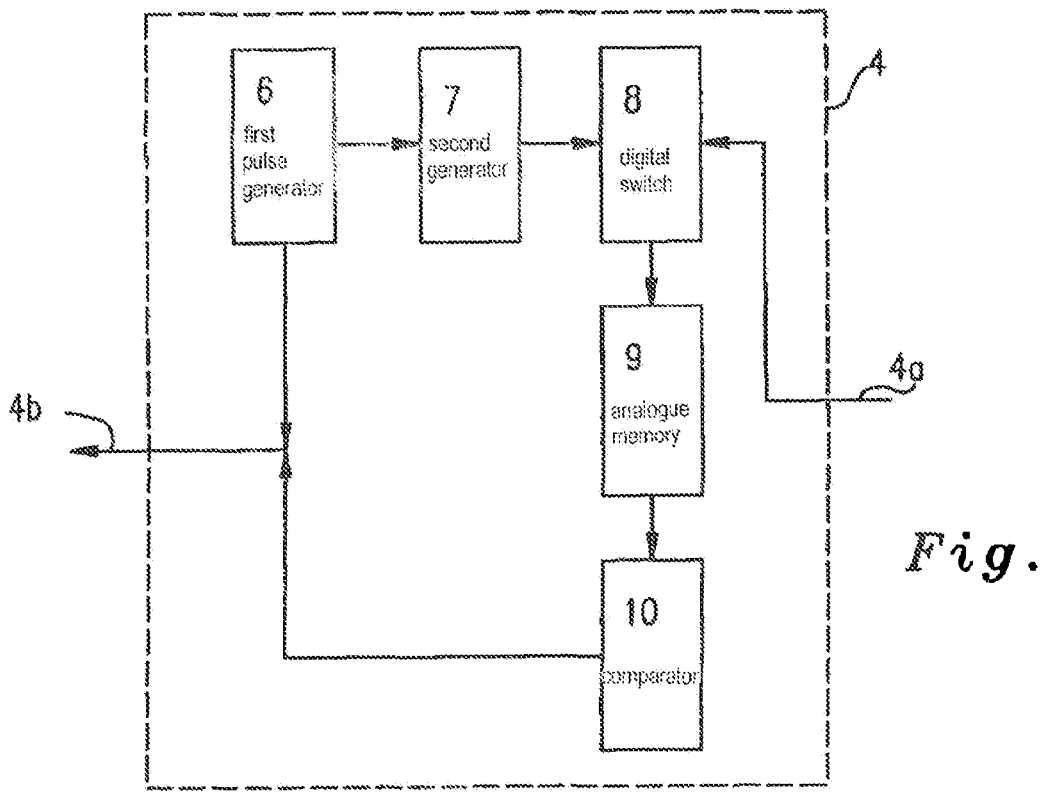
FIG. 2 is a block diagram illustrating a unit for measuring a charge of a secondary battery.
Figure 3:
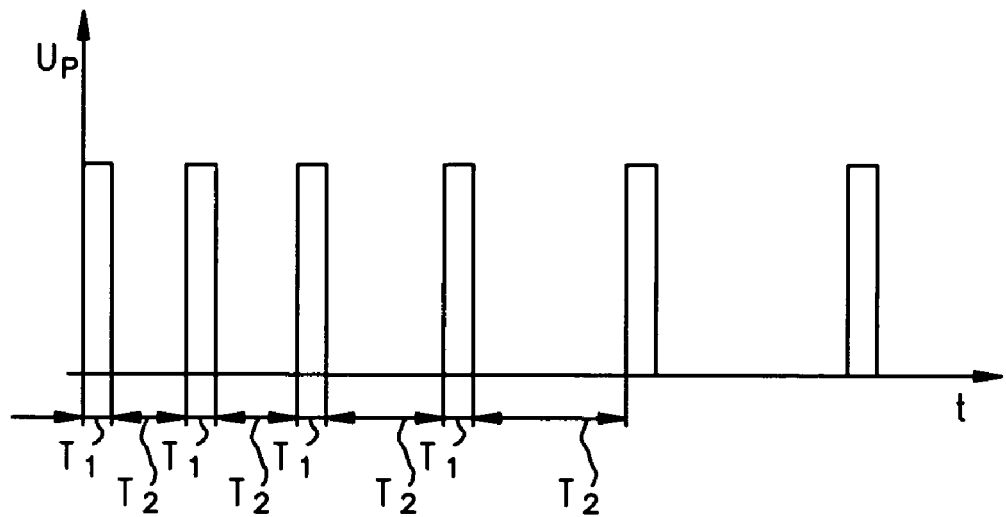
FIG. 3 is a schematic diagram of time dependence of pulsating voltage intervals.
Figure 4:
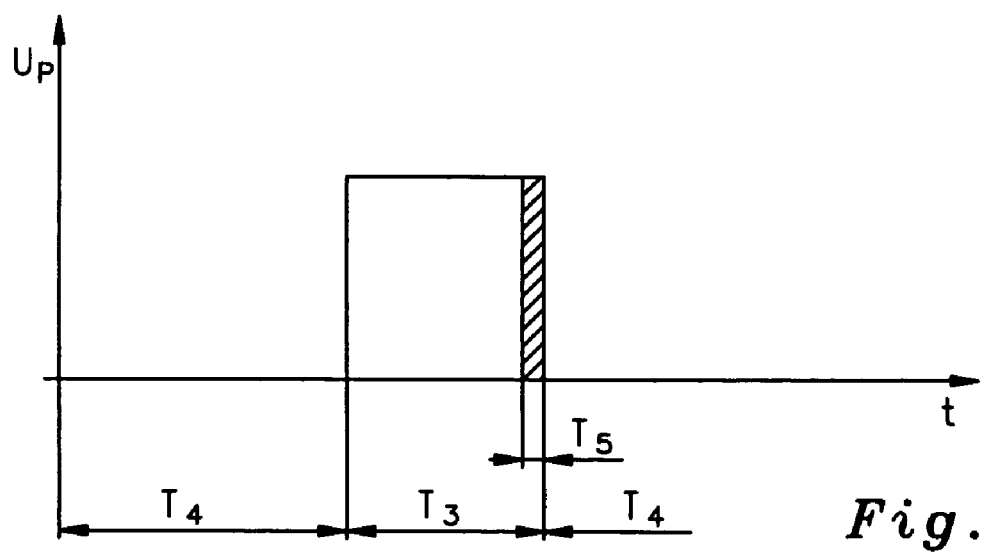
FIG. 4 is a schematic diagram of time dependence of measuring intervals.

The said amplifier 4 for measuring the voltage of open terminals of the secondary battery is described in detail with reference to FIG. 2 (surrounded with a dashed line). The first pulse generator 6 generates intervals i.e. measuring interval and duration of feeding break-up with a length $T_3$, respectively, and time $T_4$ between the two subsequent measurements. Here, the interval $T_4$ between the two subsequent measuring intervals equals to approximately 10 seconds, while the break-up interval $T_3$ lasts for approximately 0.1 second. The said intervals $T_3$, $T_4$ are transmitted to the second generator 7 which, within the measuring interval and close to the end of the break-up of the charging of the secondary battery 3 with the length $T_3$, creates on its output an actual readout time $T_5$ of the voltage of open terminals of the secondary battery (shown as ahatched area in FIG. 4). The said time $T_5$ is substantially shorter than the length $T_3$ of the measuring interval and equals to approximately 0.01 second. Within the time $T_5$ the pulse from the second generator puts into short circuit a digital switch 8, and the current runs through the line 4a from the secondary battery 3 into an analogue memory 9 being a capacitor in the given case. The analogue memory 9 memorizes the current state i.e. the actual voltage of the open terminals of the battery. The said analogue memory 9 is linked to a comparator 10 wherein the comparison voltage is stored which is compared with the voltage in the analogue memory 9. If the voltage in the analogue memory 9 is equal to or higher than the one being compared, the comparator sends into the pulse generator via the line 4b a signal to breake-up the charging of the secondary battery 3. Otherwise the process continues as described in the foregoing.

Pulses with the interval $T_4$ between the two subsequent measuring intervals are transmitted from the first generator 6 through the line 4b to the pulse generator 2 resulting in the break-up of the charging of the secondary battery 3. Interruption of the charging from the comparator 10 is entirely independent from the interruption based on the pulses of the first generator 6. At the very beginning of the charging of the secondary battery 3, while it is still empty, the charging is switched off by means of the first generator 6. Later, when the secondary battery 3 is full the charging is switched off by means of the comparator 10.

The invention claimed is:

1. A method of fast-charging a secondary battery comprising:
   a) converting AC supply voltage $U_{AC}$ into DC voltage $U_{DC}$ the value of which equals approximately twice the nominal voltage of a secondary battery to be charged,
   b) converting of the DC voltage $U_{DC}$ into a pulsating voltage $U_P$ with a pulse length $T_1$ and a pause length $T_2$, having current pulses with peaks between 30 and 40 times capacity of the secondary battery to be charged,
   c) transmitting the pulsating voltage $U_P$ to the secondary battery to be charged, wherein the pause length $T_2$ between the pulses of the pulsating voltage $U_P$ depends on the voltage in the battery to be charged, and
   d) at least one measuring of the charge of the secondary battery, comprising:
      i. generating in a first generator a pulse in charging the secondary battery of a length $T_3$ between measurements of a length $T_4$ apart,
      ii. transmitting said pause $T_3$ to a second generator.
      iii. generating an actual measuring pulse of the length $T_5$ in the second generator,
      iv. stopping fast-charging the secondary battery for the time $T_3$,
      v. transmitting said pulse from the second generator to a digital switch which is thereby short circuited for a duration of $T_5$, and
      vi. measuring an open terminal voltage of the secondary battery within pause $T_3$ and within the measuring pulse $T_5$.

2. A method of fast-charging a secondary battery according to claim 1 wherein the height of the DC voltage $U_{DC}$ ranges between 180% and 220%, and preferably between 190% and 210% of the nominal voltage of the secondary battery to be charged.

3. A method of fast-charging a secondary battery according to claim 1 wherein with the empty secondary battery the pulse length $T_1$ of the pulsating DC voltage $U_P$ equals approximately 10 microseconds, and the pause length $T_2$ equals to approximately 100 microseconds.

4. A method of fast-charging a secondary battery according to claim 1 wherein the pause length $T_2$ continuously increases up to approximately 10 milliseconds.

5. A method of fast-charging a secondary battery according to claim 1 wherein with an empty secondary battery the pulse frequency of the pulsating voltage $U_P$ ranges between 1 kHz and 15 kHz, preferably between 5 kHz and 10 kHz.

6. A method of fast-charging a secondary battery according to claim 1 wherein with the empty secondary battery the ratio of the pulse length $T_1$ to the pause length $T_2$ ranges from 1:5 to 1:10, preferably 1:8.

7. A method of fast-charging a secondary battery according to claim 1 wherein the length $T_3$ of the pause of the charging of the secondary battery equals approximately 0.1 second and that the length $T_4$ between two subsequent measurements equals approximately 10 seconds.

8. A method of fast-charging a secondary battery according to claim 1 wherein the length $T_5$ of measuring of the open terminal voltage of the secondary battery equals approximately 0.01 second.

9. A device for fast charging a secondary battery comprising:
   an AC/DC converter connected at its input to an AC supply voltage ($U_{AC}$), said converter providing at its output a DC voltage $U_{DC}$;
   a pulse generator connected in series with the said converter and generating a pulsating voltage $U_P$ of a length $T_1$ with a pause $T_2$ between two subsequent pulses, and a line having as low resistance as possible, preferably below 0.1 Ohm, connecting in series with a secondary battery to be charged, which is connected in parallel with a measuring amplifier of the open terminal voltage of the secondary battery and with a control unit;

wherein said measuring amplifier generates measuring pulses of a length $T_3$ and a pause length $T_5$ between the two subsequent measuring pulses, and wherein the measuring amplifier comprises a generator of said pauses of the length $T_3$ within the time $T_4$ between two subsequent measurements, said pauses are transmitted to the second generator which, within a measuring interval close to the end of the pause $T_3$, creates on its output an actual readout time $T_5$ of the open terminal voltage of the secondary battery, wherein said time $T_5$ is substantially shorter than $T_3$, and wherein said measuring amplifier further comprises a digital switch connected to the second generator and also with a battery, of an analogue memory and a comparator wherefrom a return line is coupled to the pulse generator, and wherein the generator of said pauses is connected via the return line to the pulse generator.

10. A device for fast charging the a secondary battery according to claim 8 wherein the pause length $T_4$ equals to approximately 10 seconds and the measuring pulse length $T_3$ equals 0.1 second, and the readout time equals approximately 0.01 second.

* * * * *